US008761149B2

(12) United States Patent
Friedrich

(10) Patent No.: US 8,761,149 B2
(45) Date of Patent: Jun. 24, 2014

(54) METHOD FOR DATA COMMUNICATION BETWEEN A BASE STATION AND A TRANSPONDER

(75) Inventor: Ulrich Friedrich, Ellhofen (DE)

(73) Assignee: Atmel Corporation, San Jose, CA (US)

(*) Notice: Subject to any disclaimer, the term of this patent is extended or adjusted under 35 U.S.C. 154(b) by 1745 days.

(21) Appl. No.: 11/526,013

(22) Filed: Sep. 25, 2006

(65) Prior Publication Data

US 2007/0063819 A1 Mar. 22, 2007

Related U.S. Application Data

(63) Continuation of application No. PCT/EP2005/003088, filed on Mar. 23, 2005.

(30) Foreign Application Priority Data

Mar. 25, 2004 (DE) .......................... 10 2004 014 643
Apr. 14, 2004 (DE) .......................... 10 2004 018 555

(51) Int. Cl.
*H04J 3/24* (2006.01)
*H04Q 5/22* (2006.01)
*H04L 1/18* (2006.01)

(52) U.S. Cl.
USPC ......... 370/349; 340/10.1; 340/10.5; 714/748; 714/751

(58) Field of Classification Search
USPC ......... 370/277, 278, 304, 468, 470, 471, 465, 370/349; 340/10.1, 10.5, 539.1, 572.1; 714/746, 748–751
See application file for complete search history.

(56) References Cited

U.S. PATENT DOCUMENTS 5,008,661 A * 4/1991 Raj ............................ 340/10.51
5,297,424 A    3/1994 Sackett
(Continued)

FOREIGN PATENT DOCUMENTS

DE   41 06 848 A1   9/1991
DE   43 34 595 C1   4/1995
(Continued)

OTHER PUBLICATIONS

Klaus Finkenzeller, "RFID Handbook, Fundamentals and Applications in Contactless Smart Cards and Identification", Second Edition, John Wiley & Sons Ltd., Chapter 7, pp. 195-219, Jul. 21, 2003.

*Primary Examiner* — Hassan Phillips
*Assistant Examiner* — Saba Tsegaye
(74) *Attorney, Agent, or Firm* — Baker Botts LLP

(57) ABSTRACT

A method for data communication between a base station and at least one transponder by a high-frequency electromagnetic carrier signal is disclosed, onto which information packets are modulated, whereby each information packet has a header section, a middle section, and an end section and whereby the middle section has a data field for the transmission of data and/or address information and a protection field placed thereafter for the correction of errors in the transmission of the data and/or address information, whereby after the data field the base station inserts at least one control field, by which the protection field following the inserted control field can be changed in such a way that the duration of an information packet is set variably. The invention relates further to a base station for carrying out this method, to a data communication system containing a base station and at least one transponder in communicative wireless contact with the base station.

23 Claims, 3 Drawing Sheets

(56) References Cited

U.S. PATENT DOCUMENTS

| | | | |
|---|---|---|---|
| 5,345,231 A | 9/1994 | Koo et al. | |
| 5,425,032 A * | 6/1995 | Shloss et al. | 370/346 |
| 5,651,116 A | 7/1997 | Le Roux | |
| 5,749,060 A | 5/1998 | Graf et al. | |
| 6,104,285 A * | 8/2000 | Stobbe | 340/505 |
| 6,424,285 B1 * | 7/2002 | Perdue et al. | 341/176 |
| 7,026,935 B2 * | 4/2006 | Diorio et al. | 340/572.2 |
| 7,177,975 B2 * | 2/2007 | Toombs et al. | 711/103 |
| 7,461,318 B2 * | 12/2008 | Fukae et al. | 714/749 |
| 2002/0044595 A1 | 4/2002 | Friedrich | |
| 2003/0001755 A1 * | 1/2003 | Tiernay et al. | 340/928 |
| 2003/0013146 A1 * | 1/2003 | Werb | 435/9 |
| 2003/0133435 A1 | 7/2003 | Friedrich | |
| 2003/0231105 A1 * | 12/2003 | Kim et al. | 340/10.2 |
| 2005/0083180 A1 * | 4/2005 | Horwitz et al. | 340/10.4 |
| 2005/0094720 A1 | 5/2005 | Friedrich et al. | |
| 2005/0128130 A1 | 6/2005 | Friedrich | |
| 2005/0180380 A1 | 8/2005 | Friedrich | |
| 2007/0013484 A1 * | 1/2007 | Carrender et al. | 340/10.4 |

FOREIGN PATENT DOCUMENTS

| | | |
|---|---|---|
| DE | 100 50 878 A1 | 5/2002 |
| DE | 101 38 217 A1 | 3/2003 |
| DE | 101 44 946 A1 | 4/2003 |
| DE | 102 04 317 A1 | 8/2003 |
| DE | 102 04 346 A1 | 8/2003 |
| DE | 102 04 347 A1 | 8/2003 |
| DE | 103 26 676 A1 | 3/2004 |
| EP | 0 456 425 A1 | 11/1991 |
| EP | 0 473 569 A2 | 3/1992 |
| EP | 0 851 239 A1 | 7/1998 |
| EP | 0 935 211 A2 | 8/1999 |
| EP | 1 279 526 A2 | 1/2003 |
| WO | WO 99/29523 | 6/1999 |

* cited by examiner

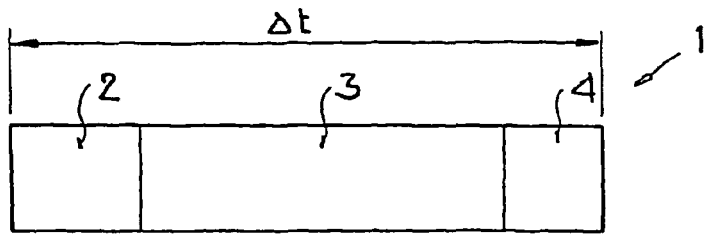
FIG.1
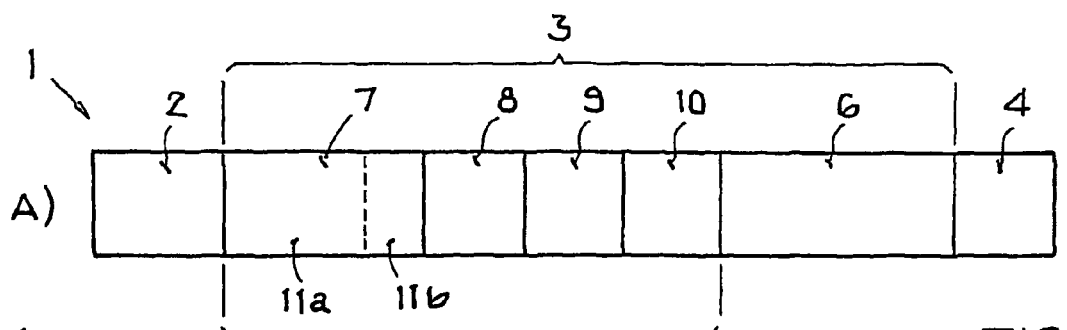
FIG.2
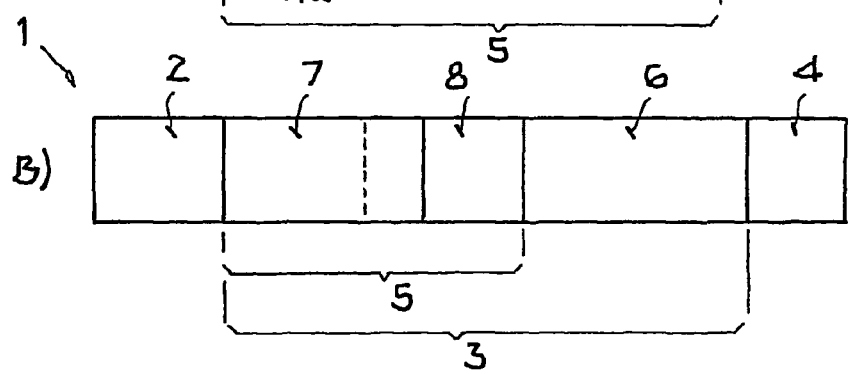
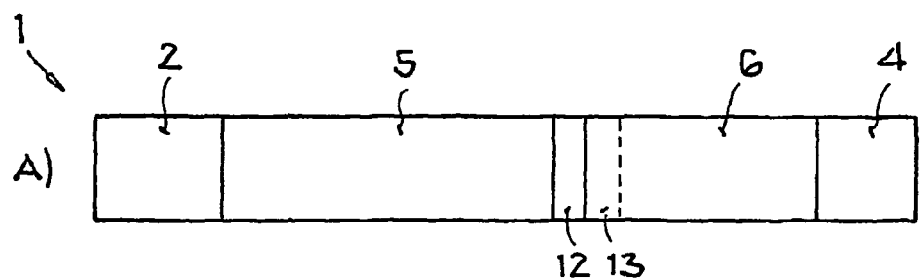
FIG.3
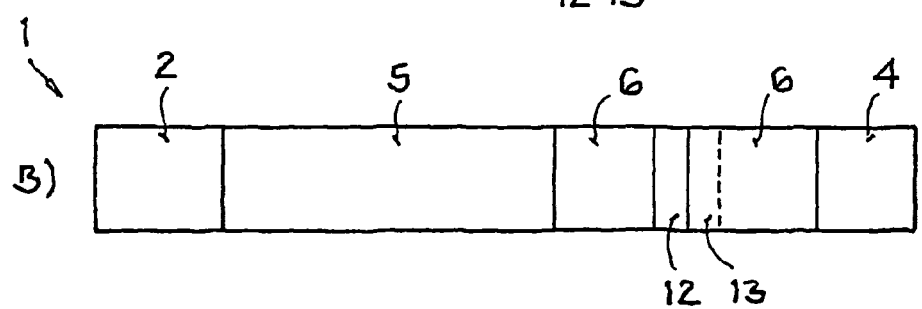

METHOD FOR DATA COMMUNICATION BETWEEN A BASE STATION AND A TRANSPONDER

This nonprovisional application is a continuation of International Application PCT/EP2005/003088, which was filed on Mar. 23, 2005, which claims priority to German Patent Application Nos. DE 102004014643 and DE 102004018555, which were filed in Germany on Mar. 25, 2004 and Apr. 14, 2004, respectively, and which are all herein incorporated by reference.

BACKGROUND OF THE INVENTION

1. Field of the Invention

The present invention relates to a method for data communication between a base station and at least one transponder by a high-frequency electromagnetic carrier signal, onto which information packets are modulated, whereby each information packet has a header section, a middle section, and an end section and whereby the middle section has a data field for the transmission of data and/or address information and a protection field placed thereafter for the correction of errors in the transmission of the data and/or address information. The invention relates further to a base station for carrying out this method and to a data communication system containing a base station and at least one transponder in communicative wireless contact with the base station.

2. Description of the Background Art

The invention falls within the realm of transponder technology and in particular within the field of contactless communication for the purpose of identification. Although it can be used in principle in any communication system, the present invention and its underlying problem are explained below with reference to RFID communication systems and their applications. Here RFID stands for "radio frequency identification." Reference is made on the general background of this RFID technology to the "RFID-Handbuch" (RFID Handbook) of Klaus Finkenzeller, Hanser Verlag, third updated edition, 2002.

In the case of transponders, an electromagnetic signal transmitted by the base station is received by the transponder and demodulated. Active, semipassive, and passive transponders are differentiated here depending on the design of their energy supply. In contrast to active transponders, passive transponders do not have their own energy supply, so that the energy necessary in the transponder for demodulating and decoding the received electromagnetic signal must be obtained from this electromagnetic signal itself transmitted by the base station. In addition to this unidirectional energy transfer, bidirectional data communication typically occurs also between the base station and transponder.

Bidirectional data communication between the base station and transponder typically includes an interrogation sequence and a response sequence.

The basis for the bidirectional data transmission between the base station and transponder thereby forms a so-called communication protocol, which specifies, in addition to the data information to be transmitted, also the control information for the data communication.

A prior-art RFID communication protocol for a known data communication between a base station and transponder is described in the Unexamined German Patent Application DE 101 38 217 A1, which corresponds to U.S. Publication No. 2003133435. Accordingly, an information packet to be transmitted from the base station to a transponder has at least one header section, a middle section, and an end section. The header section defines the number of data to be transmitted and their identification. The middle section contains the data to be transmitted in each case. The end of the information packet is communicated in the end section to the receiver of the data transmitted in each case. The data communication is protected with protection mechanisms, such as, for example, a CRC protection field or parity bits.

A generic RFID method and system for bidirectional data communication is also the subject of the so-called Palomar Project, which was established by the European Commission as part of the so-called IST program. With respect to the content of this Palomar project, reference is made to the related, generally available publication of the European Commission of Jan. 11, 2002, which corresponds substantially to the ISO standard 18000-6.

For further background on bidirectional data communication between a base station and transponder, reference is made further to the Unexamined German Patent Applications DE 102 04 317 A1, DE 100 50 878 A1, DE 102 04 346 A1, which correspond to U.S. Publication Nos. 2005094720, 2002044595, and 2005128130, respectively, and which are all herein incorporated by reference, and to European patent EP 473 569 B1, which corresponds to U.S. Pat. No. 5,345,231.

In general, methods for data communication between a base station and a transponder are used to perform an identification within an authentication process, for example, with the use of RFID technology. So that, if possible, the specific communication participants notice no delay during this data communication, the data communication must typically be completed within a time-limited span of about 100 ms. This predefined time span results particularly from the relevant HF regulations and the fact that the transponders frequently move within the field of the carrier signal transmitted by the base station. Because of reflections, field cancellations constantly occur, so that the data communication between the base station and transponder is to be completed between such field cancellations to assure proper data communication. If the authentication process has not been completed within this frequently fixedly predefined time interval, then a unique identification is usually not possible, so that the particular authentication process must be repeated. This is associated with a time delay, however.

Another aspect is that, because of increasing security requirements, a plurality of data must be transmitted by a modulated carrier wave within an increasingly shorter time. For modulation, an amplitude modulation (ASK) is very frequently used in the forward and return link. In the forward link, particularly in passive RFID systems, no phase modulation (PSK) or frequency modulation (FSK) is typically used, because in this case a mixing circuit would be necessary in the transponder, for example, to recognize a phase change. This type of mixer circuit, however, uses an extraordinary amount of current, which is frequently not available particularly in passive transponders, which only have a local energy supply. In addition to the amplitude modulation, a phase modulation is also being used increasingly in the return link for data transmission use. To achieve a higher data rate and thereby a greater range, high-frequency carrier frequencies in the range of the UHF frequency or microwave are used for data communication.

The duration of a bidirectional data communication between a base station and at least one transponder, which represents an essential parameter in RFID systems, depends inter alia on the following parameters:

the number of information packets necessary for a data communication;

the number of data transmitted per information packet and thereby the bit width of an information packet;

the type of data transmission (full duplex, half duplex); or the nature of the electromagnetic field of the carrier wave and its environment (electromagnetic interference fields).

Because of the above parameters and the fact that the transponder at times moves within the electromagnetic field of the carrier wave relative to this wave, the maximum duration of a data communication, which is available for a complete transmission of data between a base station and transponder, is physically limited. In particular, the times for this data communication also depend greatly on the specific desired application.

Without the provision of additional measures, in each case a complete information packet must be transmitted at present in the forward link and subsequently also in the return link, also when a data communication in the forward link and/or in the return link is faulty, for example, by overlapping of interfering signals. This is perhaps disadvantageous primarily for information packets which are very long in time and have many symbols, because even when a data communication for an information packet was already recognized as faulty, it must be continued until the end of the particular data communication.

UHF and microwave transponders used to date employ asynchronous communication methods, in which no internal clock is transmitted with the carrier wave, for the data communication. These communication systems therefore could be operated only in half-duplex operation. Modern communication systems operate synchronously; i.e., the base station and the at least one transponder in communicative contact with this base station operate with the same internal clock. This opens new opportunities in data communication between a base station and transponder. In particular, these can now be operated using full-duplex operation after synchronization, which greatly shortens the duration of data communication. It is also necessary thereby to reduce the number of notches as much as possible, because these produce an undesirable spectrum. In particular, the notches can undesirably generate interfering signals, which can influence very weakly formed sidebands, which is a disadvantage particularly for data retransmission in the return link. These interfering signals can at times interfere with the RFID communication system to such an extent that demodulation and thereby decoding are no longer possible or can be determined only with high computational effort. At times, the received power of these received interfering signals is so great that it can cause jams in the RFID communication system. To prevent this, the data communication may be activated only in such timeslots, during which the other interfering transmitting systems transmit no or only minor interfering signals. In a very high-interference environment, these timeslots must be limited in time in such a way that for a high efficiency the RFID communication system must be capable of supporting the shortest communication times possible.

However, this does not apply to existing RFID communication systems. This results from the fact that the structure of the corresponding RFID communication protocols, including their security level, are typically fixedly predefined. In particular, the bit width and thereby the duration of an information packet is fixedly predefined within an application and therefore can no longer be changed. In the case of a highly interfering environment, thereby data communication between a base station and transponder particularly for very long information packets and thereby for a very large volume of data to be transmitted per information packet is no longer possible or possible only with the acceptance of a more or less highly noisy data communication, because it is almost impossible to transmit all symbols trouble-free for the duration of an information packet.

Another physical problem in data communication during use of UHF or microwave signals is the presence of so-called "nulls". These "nulls" arise by constructive and destructive overlapping of the carrier signals, transmitted by the base station, by reflection off objects in the vicinity of the base station. This can result in the cancellation of parts of the transmitted signal, which ultimately also precludes trouble-free data transmission. Because of this interference phenomenon, however, an RFID data communication is no longer possible or possible only with limitation, because energy is no longer available to the transponder in the indicated cases. The transponder, however, requires this energy for data retransmission within the scope of a backscatter process. Here as well, RFID communication systems and methods for RFID data communication are required which are capable of keeping the time necessary for data communication between a base station and transponder as short as possible.

Another problem in existing RFID communication systems, which are operated within the UHF or microwave range, is that the speed of data transmission is sometimes drastically limited by national or supraregional HF provisions. In particular, national regulations within the territorial application of the Federal Republic of Germany, as well as regional provisions within the territorial application of the European Union, provide that the maximum transmitting power of an electromagnetic carrier wave during operation of an RFID system and also the corresponding carrier frequency are to be limited to such an extent that, on the one hand, other radio systems are not affected thereby and, on the other, health-related limits are not affected. Moreover, RFID systems in Europe are operated with a duty cycle that corresponds maximally to about 10% of the time during which the frequency band may be occupied. Subsequently, the base station must wait 90% of the time, which results in data communication protocols having to be as short as possible to ensure an effective, highest possible data rate. Therefore, here as well, there is the need for shorter times for data communication between a base station and transponder.

SUMMARY OF THE INVENTION

It is therefore an object of the present invention to shorten the times for a data communication. Another object of the present invention is to make the duration of a data communication more flexible. Finally, a further object of the invention is to utilize the information obtained in the backscatter method.

A method for data communication between a base station and at least one transponder by a high-frequency electromagnetic carrier signal, onto which information packets are modulated, whereby each information packet has a header section, a middle section, and an end section and whereby the middle section has a data field for the transmission of data and/or address information and a protection field placed thereafter for the correction of errors in the transmission of data and/or address information, whereby at least after the data field the base station inserts at least one control field, by which the protection field following the inserted control field can be changed in such a way that the duration of an information packet is set variably.

A base station for data communication with at least one transponder, with a transmitting/receiving device for transmitting high-frequency carrier signals and for receiving the corresponding response signals of a transponder, with an evaluation device which is coupled to the transmitting/receiving device and compares and evaluates the transmitted and the correspondingly associated response signals transmitted back by a transponder, and with a control device which is coupled to the evaluation device and controls further data communication with at least one transponder depending on the evaluation in the evaluation device.

A data communication system, particularly an RFID data communication system, with a base station of the invention, and with at least one transponder, which is in communicative contact with the base station during use of a method according to the invention, which is supplied with energy by the base station, and which can be operated in the return link in full-duplex operation to the base station.

Use of a transponder of a data communication system as a sensor, particularly as a temperature sensor and/or as a pressure sensor.

The invention is based on the knowledge that it is possible in the return link to abort the protocol of the data communication at any place. In contrast, the possibility of aborting the data communication in the forward link was not possible thus far.

The idea forming the basis of the present invention is to insert an additional control field directly after the data field and/or in the subsequent protection field. It is possible by this additional control field to replace a fixedly specified protection level for data communication in the forward link by an adaptive alterable protection level. This control field makes it possible to abort the protocol of data communication in the forward field at any place, for example, after the receipt of a specified number of correctly recognized or one or more incorrectly recognized bits of the protection field.

A variable data communication can be provided by this protection level in such a way that the length and thereby the duration of a specific information packet, which is transmitted from the base station to the transponder, can be set variably within a certain range. The variability of the duration of a transmitted information packet results particularly because, depending of the content of the control field, the desired application, and/or the quality of the data transmission, in each case individual or all security bits within the security field are not transmitted in the forward link. A premature abort of the protection field occurs here to a certain extent.

Advantages of the method according to an embodiment of the invention provide, on the one hand, adaptive protocols for data communication can thereby be provided, which have an additional protection level in the forward link, in addition to the typically present protection field. This type of additional protection of the data communication in the forward link was not provided in prior-art, generic RFID communication systems and methods.

On the other hand, data communication can be significantly shortened in this way. This is especially advantageous in cases in which the data transmission, for example, is not disrupted for a short time or disrupted only to a minor extent. It can be provided here that, for example, the protection field is totally omitted, because proper, error-free data transmission is assumed here.

Moreover, the transmission duration of an information packet can be variable depending on the environmental conditions of this data communication. These environmental conditions include in particular the transmitting power by which the data are transmitted, the distancing of the transponder from the base station, the number of the transponders communicating with the base station, and particularly an optionally present electromagnetic interference field, which is overlapped with the data signals to be transmitted and thereby can influence the data communication especially negatively.

In an embodiment of the invention, the base station even in the forward link and thereby in the transmission of the data signals to be transmitted can verify the proper receipt of these data signals by the transponder. This occurs typically by response signals transmitted back from the transponder to the transmitted data signals. The retransmission thereby occurs delayed in time to the signals correspondingly transmitted by the base station. The base station evaluates these response signals and can accordingly respond to this evaluation, in which the transmitted and the corresponding response signals are compared, and accordingly adjust the further data communication. For example, the base station can abort the data communication immediately, if it becomes evident from the evaluation that the previously transmitted data signals were received incorrectly by the transponder or a misinterpretation of the received response signals occurred within the base station.

In addition or alternatively, it can also be provided that the base station, in case of a properly recognized data communication, skips the protection field or at least parts of the protection field. This decision can be based, for example, on the realization that this type of protection for data communication is no longer regarded as necessary, because based on the evaluation of the response signals and the transmitted signals the decision was already made that the data communication was of high quality. Because of this high quality of data communication, depending on the application, at least parts of the protection field can be omitted. The protection field or parts of the protection field can also be omitted in an additional embodiment, when, for example, the base station does not place a high value on a high quality of data communication. This plays a particular role in economical, so-called "low cost" base stations and transponders. These typically have a limited functionality in regard to data communication and particularly in regard to the evaluation of the retransmitted data. In particular, it can also be provided in such base stations that bitwise checking and evaluation of the retransmitted response signals do not occur, but rather in each case the response signals are checked fieldwise or not at all.

Base stations that do not support bitwise checking of the retransmitted data are used in an embodiment by entering a chain of response signals retransmitted via the return link. A fieldwise check of the response signals, which result from the data signals transmitted in the forward link, is possible in this way in the base station.

In another embodiment, the transmission of retransmitted response signals can be limited to a minimum or even totally omitted. In the former case, the base station transmits at least one control signal, which is configured as an EOT sequence, immediately after the data field or within the protection field. If such an EOT sequence exists, the total transmission duration for an information packet is significantly shortened. If the transponder receives this EOT sequence, then the transponder is signaled that the transmission of the particular information packet is to be ended immediately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 illustrates a basic structure of an information packet for the forward and/or return link of a data communication between a base station and transponder, according to an embodiment of the present invention;

FIGS. 2a-b illustrate a structure of an information packet in the case of a long command (A) and in the case of a short command (B);

FIGS. 3a-b illustrate a structure of an information packet in the forward link of a data communication in the case of an insertion of a control field according to the invention directly after the data field (A) and within the protection field (B);

DETAILED DESCRIPTION

Figure 4:
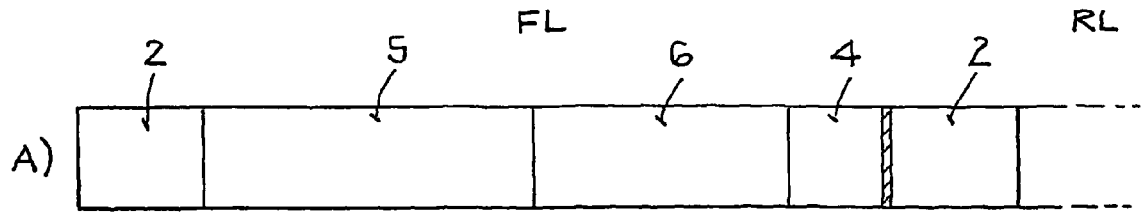
FIGS. 4a-b illustrate several information packets in the forward link and return link to illustrate the method of the invention.
Figure 4:
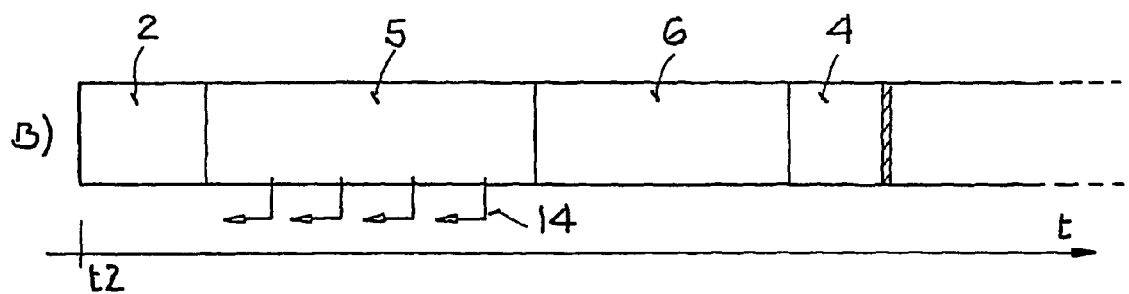

In the figures of the drawing, the same or functionally identical elements, data, and signals, if not specified otherwise, were provided with the same reference characters. Further, the presentations in FIGS. 1 through 5 refer in each case to a time sequence of a specific data communication or the specific fields of an information packet.

The data communication between the base station and transponder defines a channel, which is designated below as the forward link VL (or downlink). Conversely, the data communication from the transponder back to the base station designates a channel, which is generally designated as a return link RL (or uplink). In addition to the data communication in the return link RL, in so-called backscattering-based transponders, data communication also occurs between transponder and base station (and also conversely if applicable), in which a transmitted signal is scattered back to the transmitter with use of the backscatter cross section of the antenna of the receiver. This method is also generally known as the backscatter method. This data communication with the backscatter technique can be used in both the forward and return link.

The data transmission occurs by an amplitude-modulated carrier wave, which is transmitted on the base station side and is returned by the transponder. The data are generated by pulse pause modulation of the carrier signal, in that the transmitter of the base station turns an electromagnetic field on for the carrier signal for certain time spans. In the transponder, thus on the input side, a generated voltage signal is derived from the field strength of the carrier signal, which has voltage dips, also generally called a "notch." The data information now occurs within the time span between two such voltage dips. This time span now includes in each case a data symbol or in shorter form a symbol. The field gap, during which the transmitter of the base station is turned off and/or no electric magnetic carrier signal is transmitted, thus to a certain extent forms a separator between two successive data symbols. The significant value of a data symbol is determined from the time span during which the electromagnetic field is turned on and thereby the carrier signal has its nominal amplitude. A symbol can now contain a digital code ("0" or "1") or still further information, in addition, as will be explained below.

FIG. 1 shows first the basic structure of an information packet 1, as it is used for data communication between a base station and a transponder and as is described in, for example, from the aforementioned German Patent Application DE 101 38 217 A1. It is assumed in FIG. 1 that information packet 1 is configured for data communication in the forward link VL of the data communication system, although an information packet retransmitted to this information packet 1 in the return link may have a similar structure.

Information packet 1 has a header section 2, a middle section 3, and an end section 4.

The number of data symbols to be transmitted and their identification are defined in header section 2. This is necessary to be able to establish the precise position where a specific field begins within middle section 3 or end section 4. This need results from the fact that the duration of an information packet 1 in general and the individual fields 2-4 in particular is not fixedly defined and is largely constant, as is the case in many time slot-based data transmission methods. Rather, the duration and thereby the information transmitted within an information packet 1 can vary more or less greatly depending on the application, as is explained in greater detail below with use of FIG. 2. The data to be transmitted in the middle section 3 are coded with the identification within header section 2. In particular, header section 2 specifies reference times which are used for the further data transmission in middle section 3 or a data field 5. The speed of the data communication between the base station and transponder is also established by header section 2, for example, by means of the frequency of a free-running oscillator in the transponder. In addition, header section 2 can also be used for the synchronization of the data protocol necessary for the data communication. Moreover, header section 2 can also contain control information for the fields, following header section 2, of middle section 3 and end section 4.

The content of end section 4 indicates to the specific receiver of transmitted information packet 1 the end of this packet. In the case of the aforementioned Palomar system, end section 4 has two so-called EOT symbols (EOT=end of transmission).

Coded data symbols are transmitted in middle section 3. The most diverse data structures can be provided here depending on the desired application. Using FIG. 2, this is described with reference to two different structures of an information packet 1 in the forward link VL.

Middle section 3 generally includes a data field 5 and a protection field 6 immediately following this data field 5. In general, information packets 1 are divided into those that contain long commands and thereby long addresses and those that contain short commands and therefore short addresses (B).

FIG. 2(A) shows the structure of an information packet 1 in the case of a long command. In this case, data field 5 contains in a successive time sequence a command field 7, a parameter field 8, an address field 9, and a program data field 10. The content of these fields 7-10 depends on the specifically desired application and in particular on the volume of data symbols to be transmitted via a specific information packet 1. In a typical embodiment, command field 7, for example, has a six-bit-wide command 11a (instructions), which are followed by two protection bits 1b. The separation between command bit 11a and protection bit 11b is shown by the dashed line in FIG. 2.

In the case of an information packet 1, which has short commands in FIG. 2(B), data field 5 only has one command field 7 and a parameter field 8 placed thereafter.

In FIGS. 2(A) and 2(B), protection field 6 arranged after data field is configured as a so-called CRC protection field (CRC=Cyclic Redundancy Check). The bit width of this CRC field 6 depends in particular on the bit width of the data to be transmitted in data field 5 and/or the application determined by the user in each case. Depending on the application, therefore, a CRC protection field 6 can be provided which has a more or less wide bit width according to the desired protection redundancy. Instead of the embodiment as a CRC protection field 6, protection field 6 can also be occupied by so-called parity bits.

In particular, a very extensive CRC protection field 6 can therefore be provided during data communication of security-relevant data between the base station and the transponder. This CRC protection field 6 can have, for example, 16, 32, or even 64 bits depending on the data in data field 5. CRC protection field 6 very often has a number of protection bits corresponding to the number of bits in data field 5. However, this makes the data transmission of an information packet 1, in which both the data bits in data field 5 and in CRC protection field 6 must be transmitted, extremely time-consuming, because even with faulty data communication it is nevertheless necessary to completely run through this protection field 6.

It becomes evident therefore that the duration Δt of a specific information packet 1 depends more or less greatly on the data symbols to be transmitted, i.e., on the commands, parameters, addresses, CRC protection data, etc. Without further measures, this duration Δt of an information packet 1 is fixedly specified.

FIG. 3 in a schematic drawing shows the structure of an information packet in the forward link VL, in which the length of this information packet 1 can be variably adjusted within certain limits.

The present invention provides that a control field 12 can be inserted into the structure of information packet 1 immediately after data field 5 (FIG. 3(A)). This control field 12 is inserted by the base station in the forward link VL in information packet 1 and forms an additional protection level for further data communication. Furthermore, bit 13 of the subsequent CRC protection field 6, the bit which immediately follows control field 12, is shown as a dashed line. Upon receiving the content of control field 12, the transponder transmits a CRC bit, which is evaluated by the base station. The base station then transmits bit 13 as a confirmation signal to the transponder, which indicates that the base station does or does not agree with the content of control field 12.

Control field 12 can be inserted in addition or alternatively also within protection field 6 (see FIG. 3(B)).

The method of the invention will be described below by means of FIGS. 4 and 5 with use of control field 12 inserted into the data transmission protocol according to the invention.

The method of the invention is based on the principle that the data communication between a base station and a transponder is first initiated by the base station. In this case, at first all transponders that can be accessed by the base station wait for this base station to begin data communication. The transponder(s) respond(s) to this only when they have received some valid command from the base station. For this reason, a data communication between a base station and transponder begins initially in the half-duplex operation. This principle is also commonly called the "reader talks first" principle, whereby the reader designates the base station in this case.

Method Step 1:

FIG. 4(A) shows a first step of the data communication, in which at time t0 the base station begins to transmit a first information packet 1. In so doing, beginning at time t0 the base station in the forward link VL first transmits a complete information packet 1 to the transponder. This lasts until time t1. Next, i.e., after time t1, the transponder responds to the data transmitted by the base station in the forward link VL with an information packet 1, which is transmitted via the return link RL. This retransmission is completed by time t2. During the retransmission of data in the return link RL, for example, the data required by the base station in the forward link VL, are retransmitted by the transponder.

In the first step (see FIG. 4(A)) of the data communication, the data transmission occurs completely separately in the forward link VL and the retransmission of these data in the return link RL. This asynchronous method with a time separation of the sequences in the forward link VL and in the return link RL is generally also called half-duplex operation. The first method step in the half-duplex operation therefore also has the purpose of synchronizing the base station and the transponder and thereby their data communication in the forward link VL and return link RL.

Synchronicity in the present patent application is always to be understood as a clock provided by the base station which is derived, for example, from the time interval of two neighboring notches (voltage dips) in the transmitted signal. As a result, the data transmission in the forward link VL is always synchronous, whereas the data transmission in the return link RL may be asynchronous or synchronous to the clock of the transmitted signal in the forward link VL.

Method Step 2:

After the return link RL was synchronized to the forward link VL—this can already have occurred after an information packet 1 in the forward link VL and return link RL—the further data communication between base station and transponder can be continued in full-duplex operation. The transponder therefore switches to the full-duplex operation totally automatically.

In this full-duplex operation, the base station first transmits signals to the transponder. The transponder receives these data, evaluates them, and transmits back the data required by the base station. In addition, in the forward link of the data transmission, the transmitted data is retransmitted to the base station by the transponder with use of the generally known backscatter technique (backscattering).

In this manner, a full-duplex data transmission can be realized to a certain extent at the symbol level. In this case, during full-duplex operation, two pieces of information are transmitted per symbol: On the one hand, the value of a data information is transmitted by the base station in the forward link. On the other, control information (or also regulating information) for this value is transmitted back by the transponder by backscattering no matter whether the directly transmitted value was accepted or not and whether the data communication is to be aborted or not. The base station is thereby capable of evaluating the response signals retransmitted by backscattering. If it does not do this, as is the case in many economical base stations, this does not interfere with further data communication.

In the present case, full-duplex or half-duplex operation is to be understood as referring to the time domain and not to the frequency domain.

FIG. 4(B) shows the second step of the data communication between a base station and transponder, in which the data communication is continued in full-duplex operation. It is assumed here that the data communication between a base station and transponder is now synchronized. The base station continually transmits data from data field 5 to the transponder. The transponder transmits response signals in backscatter operation as a response to the received data symbols. These response signals provide information whether the transponder has correctly received the transmitted data from the base station or whether these were received faultily. The response signals 14, retransmitted by the transponder and shown only schematically in FIG. 4(B), are therefore transmitted back to the base station and can be evaluated accordingly by the base station. This evaluation, for example, can include a comparison of these response signals with the corresponding transmitted signals for agreement of the coded data contained therein. If these data agree, then proper data communication from the base station to the transponder and back can be concluded. If these data do not agree, then the error can have occurred in different routes in the data communication, for example:

in the transmission route during transmission of the data from the base station to the transponder;

in the transmission route during retransmission of the response signals from the transponder to the base station;

within the transponder during receiving, demodulation, and/or decoding of the received signals and during the corresponding coding and modulation of the response signals in the transponder;

within the base station during transmission of the data signals; or within the base station during receiving, demodulation, and/or decoding of the corresponding response signals.

Whether and to what extent the retransmitted response signals are compared with the transmitted signals in the base station depends, on the one hand, on the structure and mode of operation of the base station and, on the other, on the specifically desired application. This means that the retransmitted response signals need not necessarily be evaluated within the base station. An evaluation does not occur, for example, when the base station has been made as a "low cost reader" and does not have this type of functionality. Moreover, in many cases, an evaluation of the retransmitted response signals is also not desired, because this is not even possible, particularly in the case of a plurality of transponders located in the immediate vicinity of the base station. In addition or alternatively, it can also be provided that this evaluation might significantly reduce the efficiency of the base station and therefore is not carried out at all.

The base station, however, is capable of comparing the response signals with the corresponding transmitted signals and to obtain conclusions on the quality of the data communication and thereby the data transmission route. This evaluation according to the invention will be described in greater detail below.

According to the invention, the base station now inserts a control field 12 into the structure of an information packet 1 in the forward link VL. Typically, control field 12 has a single EOF control symbol (EOF=end of file), although a higher number of control symbols would be conceivable. Switching to a variable, alterable protection level is thereby possible by the first EOF control symbol within control field 12. The base station interprets the symbols received after the first EOF control symbol as confirmation symbols. If the confirmation symbols are also interpreted as a component of control field 12, then the control symbol has at least two symbols.

The first symbol of control field 12 is therefore always configured as an EOF control symbol. Control field 12 is terminated by another EOF control symbol, which signals the transponder that this control field 12 has now ended.

This second EOF control symbol, which designates the end of control field 12, is also the first EOF symbol of EOT end section 4. This constellation is particularly suitable in adaptive control and/or protection fields 12, 6, whose length can be adjusted. It would also be conceivable, however, in another embodiment that the length of this control field 12 is fixedly specified. However, in this case, control field 12 must not be terminated by a second EOF control symbol. It is also sufficient here in a very simple embodiment for only one EOF control symbol to be present, which indicates the start of this control field 12.

The content of inserted control field 12 provides information whether and where the protection field 6 following the data field is to be stopped. In particular, the length of a just transmitted information packet 1 can thereby be influenced in a very elegant manner. In this case, the content of inserted control field 12 can be selected depending on the evaluation of the retransmitted response signal with the correspondingly transmitted signal from the base station. In addition or alternatively, the content of the inserted control field 12 can also be set independent of the retransmitted response signals. This depends primarily on the desired application and configuration of the base station.

Control field 12 can have other symbols, for example, a "0" and a "1," apart from the EOF control symbol. In this case, control field 12 thus has three different control symbols, which will be described only briefly below:

EOF symbol:

The first EOF symbol signals the transponder that the data communication of an information packet is to be ended. The following CRC symbols of CRC protection field 6, with the exception of a bit as the confirmation signal, should thereby no longer be transmitted or the further running through the loop of the CRC protection field 6 can be aborted (see FIG. 5(C)). The data communication in the forward link VL is ended by the insertion of such an EOF symbol 12 and by the transmitting back of an appropriate confirmation signal. The further data communication is then continued by transmitting the required data in the return link RL.

Value "0":

With a low logic level ("0") of a CRC control symbol, the base station signals the transponder that a proper data communication was present in the previously transmitted symbol. The base station here has agreed with the data communication. The data communication is continued only as long as the control symbol transmitted by the base station has a "0." In this case, depending on the security with which a data transmission is to occur, the CRC protection field 6 can be transmitted repeatedly. The signal/noise ratio can be advantageously increased by the repeated transmission of the symbol of CRC protection field 6. The repeated transmission of the symbols of the CRC protection field 6 then occurs when a high security is required in the data communication because of the application. After this type of proper data communication, the end of the specific information packet 1 is signaled with the transmission of the EOT symbols of EOT field 4 (see FIG. 5(A)).

Symbol "1":

With a high logic level ("1") of a CRC control symbol, the base station signals the transponder that there is an error in the previously transmitted symbol. It can be provided here that the data communication between a base station and transponder is aborted immediately at this place and the appropriate information packet 1 is transmitted again to ensure proper data communication (see FIG. 5(B)). The previously transmitted command is therefore not to be executed.

In general, therefore, the CRC symbols of the CRC protection field 6 are run through until this data transmission is ended by insertion of EOF control symbol 12 or aborted in the case of an error in the data transmission. EOF symbol 12 can also be transmitted just at the beginning of CRC protection field 6, when, for example, security plays no role in the data communication. This also applies in the case when the base station agrees with all data signals retransmitted by the transponder in the data field. In this case as well, CRC protection field 6 can be omitted, for example. In this case, the transponder would transmit one more bit of CRC protection field 6 as a response signal or as confirmation of the received EOF symbol.

It is essential in the method of the invention that the protection level is not changed by insertion of control field 12. This means that, in the case of a protection field 12 configured as a CRC field, the architecture of a CRC generator for generating the appropriate protection bits is retained. This is assured by the insertion of EOF control symbol 12 according to the invention.

Figure 6:
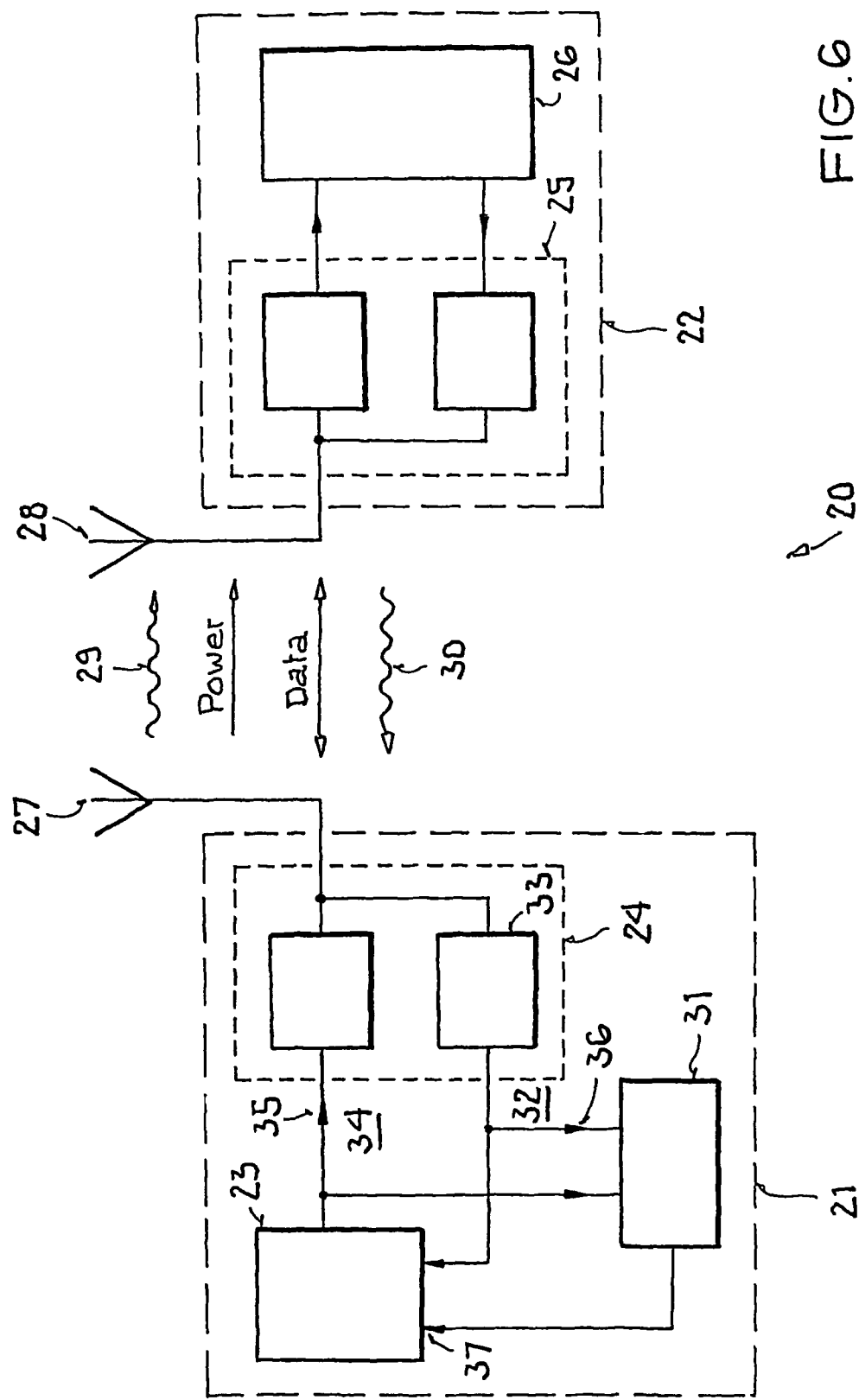
FIG. 6 illustrates, with a block diagram, a structure of an RFID communication system containing a base station and at least one transponder for carrying out a method of the invention, according to an embodiment.

FIG. 6 in a block diagram shows the structure of an RFID communication system containing a base station and at least one transponder for carrying out the method of the invention.

The communication system designated with reference character 20 has a base station 21 and a transponder 22. Base station 21 and transponder 22 are in communicative contact here. The communication system is designed as a so-called master-slave communication system, the base station functioning as the master and the transponder(s) each as slaves. Base station 21 has a control device 23 and a transmitting/receiving device 24 (transceiver). In a similar way, transponder 22 has a transmitting/receiving device 25 and a control device 26. Transmitting/receiving device 24 of base station 21 is designed to transmit high-frequency carrier signals 29 via antenna 27 to an antenna 28 of transponder 22. In a similar way, the transmitting/receiving device 25 of transponder 22 is designed to transmit the appropriate response signals 30—the so-called confirmation signals—back to the base station 21 in full-duplex operation in response to transmitted signals 29. The data communication is controlled in each case by means of control devices 23 or 26.

The data communication is further designed so that bidirectional transmission of data occurs between base station 21 and transponder 22, whereby the two directions of the data transmission are predefined by the forward link VL and/or the return link RL. To that end, transponder 22 is supplied with power unidirectionally via carrier signals 29.

To carry out the method of the invention, base station 21 has an evaluation device 31. Evaluation device 31 is placed in receiving path 32 of base station 21 and downstream to receiver 33 of transmitting/receiving device 24. Evaluation device 31 is linked furthermore with transmission path 34 of base station 21. On the output side, evaluation device 31 is connected to a control input of control device 23. Evaluation device 31 is thereby supplied with signals 35 to be transmitted to transponder 23 and response signals 36 retransmitted by transponder 23. The transponder evaluates these two signals 35, 36. Depending on this evaluation or on a comparison of the two signals 35, 36, evaluation device 31 on the output side generates a control signal 37, which is supplied to control unit 23. Control unit 23, which is supplied, in addition to control signal 37, also with signals 36 derived from response signal 30, inserts an appropriate EOF control field 12 in the signal to be transmitted, as described previously with use of FIGS. 3 through 5, into the protocol of an information packet 1. The corresponding method of the invention, indicating where and under which conditions this control field 12 is inserted into a specific information packet, was already described in detail previously with reference to FIGS. 3 through 5.

FIG. 6 illustrates the structure of base station 21 and transponder 22 intentionally in a very simplified way for the sake of clarity. It goes without saying that the functional units necessary for data communication between base station 21 and transponder 22, such as a demodulator, power supply, synchronization device, decoder, and the like, are of course present in these units 21, 22. It is pointed out in particular that, for example, signal 36 derived from response signal 30 is already present bandpass filtered, rectified, and demodulated before coupling into evaluation unit 31. This also applies, of course, to signal 34, which is also coupled into evaluation device 31. In addition or alternatively, the functionality of the bandpass filtering, rectification, and demodulation can also be provided in evaluation device 31.

There are several design options for implementing the method of the invention; some of these are described briefly below. All methods described below are based substantially on the properties of full-duplex operation. The data communication is controlled in each case by header section 2 of an information packet 1. In so doing, the data transmitted from the base station to the transponder are already retransmitted in the forward link VL by backscattering as response signals from the transponder to the base station. These response signals are then evaluated by comparison with the transmitted signals.

First Method:

If the base station provides only a preferred position (zeros) for a certain number of bits, then a subsequent decoding, deviating from this preferred position, i.e., one or more ones, is interpreted as an "error." This interpretation or evaluation occurs in evaluation device 31. If the transponder in contrast has received only zeros, the corresponding data communication is accepted as valid and thereby free of error. If the transponder sees different priorities for the transmitted data symbols in the initial section, a general approach can be used here, i.e., a fixed protection length with a logic end check, to assure the upward compatibility of the transponder to the base station.

The advantage of this first method is primarily that only short fields are present in CRC protection field 6 of the protocol and optionally, a long field, to appropriately mark a recognized error.

This function can also be hidden; for example, the transponder can also disable the clock for CRC protection field 6.

Second Method:

In this second method, the base station after the end of data field 5 transmits an EOF control symbol as a component of control field 12. Transponders that do not support the insertion of such an EOF symbol into the protocol of transmitted information packet 1 recognize this, for example, as an error. These transponders can be configured to withdraw into a passive state or be placed in a passive state, because their protocol for the data transmission and thereby the total number of transmitted bits (data bits and protection bits) for an expected data sequence do not agree with the number of received bits. The transmitted information packet will therefore be interpreted as incorrect. Such transponders, which support this type of flexible data communication with the option of an inserted control field, would at this point in turn transmit a check symbol, determined from the transmitted EOF control symbol 12 or a value derived therefrom, back to the base station. Depending on the decoding of this EOF control symbol 12, the base station can now signal to this transponder whether the data communication has occurred properly or is encumbered with errors. For example, the base station transmits a short character ("0") for EOF control symbol 12 to indicate proper data communication and a long character ("1") to mark a faulty data communication.

The number of response signals can advantageously be set to zero, provided this is necessary or required. Preferably the minimal number of the (time-delayed) retransmitted response signals is greater than zero, however.

Such transponders that require CRC protection field 6 for clock extraction can also support the method of the invention, because a higher number of protection symbols can also be transmitted. After the receipt of the transmitted CRC protection symbols, normal clock signals can be received by the transponder. Upward compatibility is also provided in this way.

The advantage of this method is the decided separation of data field 5 and protection field 6 or the protection level newly introduced by control field 12. In this implementation, in the case of a CRC implementation, both options for security checking are possible:

The CRC register continues to function as a CRC register;
The CRC register functions as a shift register and in each case, the last position of the shift register is output. The receiver then checks the response signals coming in bit by bit.

Third Method:

In this third method, after the completion of the arbitration phase, the check sum (parity, CRC) is retransmitted by the transponder. The base station preferably transmits only the short character ("0"). If the transponder receives a long character ("1"), it discards the result positively obtained during arbitration and remains still.

Reference is made to the German Patent Application DE 101 38 217 A1, which is incorporated by reference herein, with respect to the control of the data communication and particularly with respect to the control of the length of an information packet 1. This publication describes a control mechanism for adapting the data rate to the communication conditions and particularly to the national HF regulations. By this method described in DE 101 38 217 A1, the data rate can therefore be considerably increased. This publication is incorporated herewith into the present application particularly in regard to the control mechanism by header section 2 of a data protocol, by which the number of symbols used for coding in the data region and their identification is defined.

Although the present invention was described above with reference to a preferred exemplary embodiment, it is not limited thereto but can be modified in many ways.

The invention is not limited in particular exclusively to RFID systems, but of course can also be expanded, for example, to item identification. The individual items frequently need not be uniquely identified. It is often also sufficient here that a presence, for example, of a defective item can be ruled out. This is also usually called nonunique identification. During operation of the transponder in this regard, it has the function of a remote sensor. The invention therefore also refers explicitly to such sensors, in which a communication is made to read out and write the data of a data carrier or sensor. A temperature sensor, pressure sensor, or the like are mentioned as an example of such so-called remote sensor application.

Figure 5:
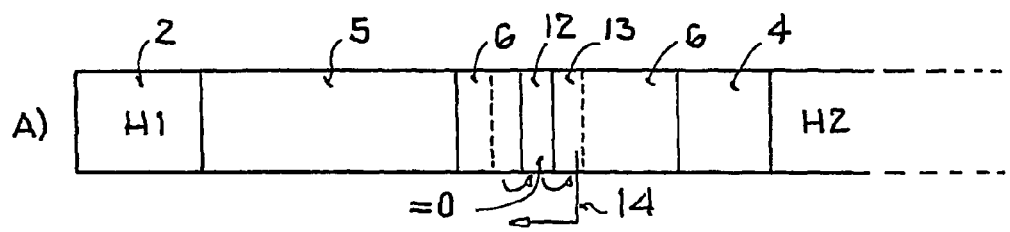
FIGS. 5a-c illustrate different sequences of a data communication after the insertion of the control field in the forward link according to the invention.
Figure 5:
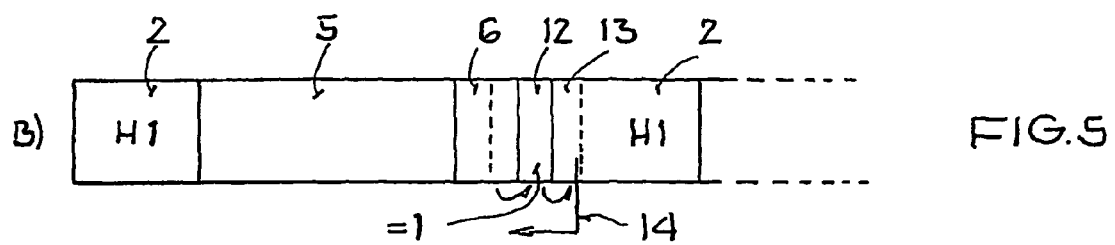
Figure 5:
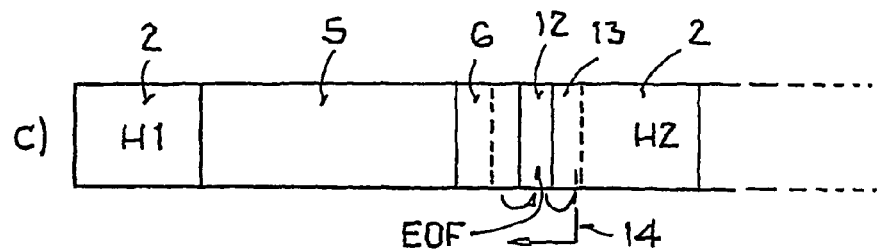

In the embodiments of FIGS. 4 and 5, it was assumed in each case that the content of control field 12 has a single symbol, namely, EOF. It would naturally also be conceivable that two or more symbols are provided for this for the control field. It would be conceivable further to provide several control fields, which can be inserted at different sites into the information packet, instead of only one control field. With suitable matching of these control fields to each other, a highly flexible data communication is provided thereby, which can be adapted at any time flexibly to the specific data communication circumstances.

The data communication system and method described above were described with the help of the "reader talks first" principle. The "tag talks first" principle in which the base station waits for a request from a transponder would naturally also be conceivable. Nevertheless, this principle has a poorer reaction time, so that primarily the "reader talks first" principle is employed in modern so-called "long range" data communication systems.

In the present exemplary embodiments, in each case a logic zero designates proper data communication and a logic one a faulty data communication. Naturally, the reverse logic would also be conceivable here.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
a inserting a control field into an information packet comprising one or more data fields and a protection field, the protection field for determining whether a signal is accurately communicated to a transponder, the control field separating the information packet into a first portion preceding the control field and a second portion following the control field;
transmitting, to the transponder, the first portion of the information packet preceding the control field of the information packet;
determining a value of the control field;
transmitting, to the transponder, the second portion of the information packet following the control field when the control field has a first value, the first value indicating that the first portion of the information packet preceding the control field has been correctly received by the transponder; and
retransmitting, to the transponder, the first portion of the information packet preceding the control field when the control field has a second value, the second value indicating that the first portion of the information packet preceding the control field has not been correctly received by the transponder.

2. The method according to claim 1 further comprising not transmitting the second portion of the information packet following the control field and not retransmitting the first portion of the information packet preceding the control field when the control field has a third value.

3. The method according to claim 2 further comprising transmitting at least a portion of a second information packet.

4. The method according to claim 1 further comprising at least one of the following:
inserting the control field immediately after the data field;
inserting the control field after the data field and within the protection field; and
inserting the control field into a forward link of a data communication.

5. A method comprising:
a inserting a control field into an information packet comprising one or more data fields and a protection field, the protection field for determining whether a signal is accurately communicated to a transponder, the control field separating the information packet into a first portion preceding the control field and a second portion following the control field;

transmitting, to the transponder, the first portion of the information packet preceding the control field of the information packet;

determining a value of the control field;

transmitting the second portion of the information packet following the control field when the control field has a first value, the second portion of the information packet following the control field comprising at least a portion of the protection field; and retransmitting the first portion of the information packet preceding the control field when the control field has a second value.

6. The method according to claim 5, the first value indicating that the first portion of the information packet preceding the control field has been correctly received by the transponder.

7. The method according to claim 5, the second value indicating that the first portion of the information packet preceding the control field has not been correctly received by the transponder.

8. The method according to claim 5 further comprising not transmitting the second portion of the information packet following the control field and not retransmitting the first portion of the information packet preceding the control field when the control field has a third value.

9. The method according to claim 8 further comprising transmitting at least a portion of a second information packet.

10. The method according to claim 5 further comprising at least one of the following:
inserting the control field immediately after the data field;
inserting the control field after the data field and within the protection field; and
inserting the control field into a forward link of a data communication.

11. The method according to claim 5 further comprising generating a content of the control field based on data in the data field, the content of the control field predefining the place in the information packet where the control field is inserted.

12. The method according to claim 5 further comprising:
transmitting at least one complete information packet to the transponder in a forward link; and
receiving at least one response signal from the transponder in a return link.

13. The method according to claim 12 further comprising:
transmitting one or more symbols to the transponder in the forward link; and
receiving, in response to transmitting the one or more symbols to the transponder in the forward link, one or more corresponding response signals from the transponder.

14. The method according to claim 5, wherein the protection field comprises symbols configured as CRC protection symbols by which proper data communication of the information in the data field is assured.

15. A system comprising:
a control device operable to determine a value of the control field; and
a transmitting device operable to:
inserting a control field into an information packet comprising one or more data fields and a protection field, the protection field for determining whether a signal is accurately communicated to a transponder, the control field separating the information packet into a first portion preceding the control field and a second portion following the control field;
transmit, to the transponder, the first portion of the information packet preceding the control field of the information packet, the information packet comprising a protection field and a data field;
transmit, to the transponder, the second portion of the information packet following the control field when the control field has a first value, the second portion of the information packet following the control field comprising at least a portion of the protection field; and
retransmit, to the transponder, the first portion of the information packet preceding the control field when the control field has a second value.

16. The system according to claim 15, the control device being further operable to assign the first value to the control field in response to determining that the first portion of the information packet preceding the control field has been correctly received by the transponder.

17. The system according to claim 15, the control device being further operable to assign the second value to the control field in response to determining that the first portion of the information packet preceding the control field has not been correctly received by the transponder.

18. The system according to claim 15, the transmitting device being further operable to not transmit the second portion of the information packet following the control field and not retransmit the first portion of the information packet preceding the control field when the control field has a third value.

19. The system according to claim 18, the transmitting device being further operable to transmit at least a portion of a second information packet.

20. The system according to claim 15, the control device being further operable to do at least one of the following:
insert the control field immediately after the data field;
insert the control field after the data field and within the protection field; and
insert the control field into a forward link of a data communication.

21. The system according to claim 15, the control device being further operable to generate a content of the control field based on data in the data field, the content of the control field predefining the place in the information packet where the control field is inserted.

22. The system according to claim 15 further comprising a receiving device, the transmitting device being further operable to transmit at least one complete information packet to the transponder in a forward link and the receiving device being operable to receive at least one response signal from the transponder in a return link.

23. The system according to claim 22 further comprising a receiving device, the transmitting device being further operable to transmit one or more symbols to the transponder in the forward link and the receiving device being operable to receive, in response to the transmitting device transmitting the one or more symbols to the transponder in the forward link, one or more corresponding response signals from the transponder.

* * * * *